(12) United States Patent
Inagaki et al.

(10) Patent No.: US 10,409,026 B2
(45) Date of Patent: Sep. 10, 2019

(54) LENS DRIVING DEVICE, CAMERA MODULE, AND METHOD FOR MANUFACTURING LENS DRIVING DEVICE

(71) Applicant: ALPS ALPINE CO., LTD., Tokyo (JP)

(72) Inventors: Yasushi Inagaki, Miyagi (JP); Hiroshi Osada, Miyagi (JP); Toshiyuki Tanaka, Miyagi (JP); Ken Okochi, Miyagi (JP); Akiyoshi Sarudate, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 65 days.

(21) Appl. No.: 15/912,931

(22) Filed: Mar. 6, 2018

(65) Prior Publication Data

US 2018/0259741 A1    Sep. 13, 2018

(30) Foreign Application Priority Data

Mar. 13, 2017    (JP) .................................. 2017-047696

(51) Int. Cl.
| | |
|---|---|
| *G02B 7/02* | (2006.01) |
| *G02B 7/09* | (2006.01) |
| *H02K 41/035* | (2006.01) |
| *G03B 13/36* | (2006.01) |
| *G02B 7/08* | (2006.01) |

(52) U.S. Cl.
CPC ................. *G02B 7/09* (2013.01); *G02B 7/08* (2013.01); *G03B 13/36* (2013.01); *H02K 41/0356* (2013.01); *G03B 2205/0007* (2013.01); *G03B 2205/0069* (2013.01)

(58) Field of Classification Search
CPC . G02B 7/09; G02B 7/08; G02B 13/36; H02K 41/0356; G03B 2205/0007; G03B 2205/0069
USPC .......................... 359/811, 819, 822, 823, 824
See application file for complete search history.

(56) References Cited

U.S. PATENT DOCUMENTS

2018/0234004 A1*    8/2018    Moto ................. H02K 41/0356

FOREIGN PATENT DOCUMENTS

JP    2015-099322    5/2015

\* cited by examiner

*Primary Examiner* — William Choi
(74) *Attorney, Agent, or Firm* — IPUSA, PLLC

(57) ABSTRACT

A lens driving device includes a movable part, a plate spring that movably supports the movable part, a coil provided on the movable part, and magnets facing the coil. An outer portion of the movable part includes protrusion opposing parts where first restricting protrusion and second restricting protrusions face each other in an optical axis direction and non-opposing parts where the first restricting protrusion and the second restricting protrusions do not face each other in the optical axis direction, the coil is formed by winding a conductor wire around the outer portion in a circumferential direction and includes first coil portions positioned in the protrusion opposing parts and second coil portions positioned in at least some of the non-opposing parts, and the width of the second coil portions in the optical axis direction is greater than the width of the first coil portions in the optical axis direction.

12 Claims, 11 Drawing Sheets

LENS DRIVING DEVICE, CAMERA MODULE, AND METHOD FOR MANUFACTURING LENS DRIVING DEVICE

CROSS-REFERENCE TO RELATED APPLICATION

The present application is based upon and claims the benefit of priority of Japanese Patent Application No. 2017-047696, filed on Mar. 13, 2017, the entire contents of which are incorporated herein by reference.

BACKGROUND OF THE INVENTION

1. Field of the Invention

An aspect of this disclosure relates to a lens driving device, a camera module, and a method for manufacturing the lens driving device.

2. Description of the Related Art

Japanese Laid-Open Patent Publication No. 2015-099322 discloses a lens driving device that includes a lens holding part (movable part) on which a lens body can be mounted and a support part. The lens holding part is supported via a lower plate spring and an upper plate spring by a support part.

The lens holding part includes a flange that extends continuously along the entire circumference of the lens holding part and protrudes laterally, and multiple protrusions that are formed at intervals along the circumferential direction to face the flange in the optical axis direction. The flange and the protrusions are formed as a monolithic part. A conductor wire is wound around the outer surface of the lens holding part between the flange and the protrusions to form a coil.

A magnet is fixed to the support, and the magnet faces the coil. Connection terminals are formed in a metal part embedded in the support. A drive current is applied from the connection terminals via the lower plate spring to the coil to cause the lens holding part to move in the optical axis direction of the lens body and thereby focus an image on an imaging device.

In the lens driving device described in Japanese Laid-Open Patent Publication No. 2015-099322, the coil is wound such that the width of the coil in the optical axis direction in a portion where the flange and the protrusions face each other is equal to the width of the coil in a portion where no protrusion is present. Therefore, when a strong and undesired external impact is applied to the lens driving device due to, for example, a fall, the position of the coil may be shifted in the circumferential direction with respect to the lens holding part. This positional shift may apply large tension to an end of the conductor wire leading from the coil and break the conductor wire, and may damage a solder joint between the end of the conductor wire and the plate spring.

To prevent the positional shift of the coil with respect to the movable part, the coil and the lens holding part may be bonded together using a large amount of adhesive. However, when a large amount of adhesive is used, a portion of the adhesive may adhere to an undesirable part, and the productivity may be reduced.

SUMMARY OF THE INVENTION

In an aspect of this disclosure, there is provided a lens driving device that includes a movable part on which a lens body is mountable, a plate spring that supports the movable part such that the movable part is movable in an optical axis direction of an optical axis of the lens body, a coil provided on the movable part, and magnets facing the coil. A first restricting protrusion and second restricting protrusions are formed in an outer portion of the movable part, the outer portion includes protrusion opposing parts where the first restricting protrusion and the second restricting protrusions face each other in the optical axis direction and non-opposing parts where the first restricting protrusion and the second restricting protrusions do not face each other in the optical axis direction, the protrusion opposing parts and the non-opposing parts are arranged alternately in the outer portion in a circumferential direction around the optical axis, the coil is formed by winding a conductor wire around the outer portion of the movable part in the circumferential direction, the coil includes first coil portions positioned in the protrusion opposing parts and second coil portions positioned in at least some of the non-opposing parts, and the width of the second coil portions in the optical axis direction is greater than the width of the first coil portions in the optical axis direction.

DESCRIPTION OF THE PREFERRED EMBODIMENTS

An aspect of this disclosure solves or reduces one or more problems of the related-art technologies, and makes it possible to provide a lens driving device where the movement of a coil in the circumferential direction is prevented without strongly bonding the coil and a movable part (lens holding part) together, a camera module including the lens driving device, and a method for manufacturing the lens driving device.

Embodiments of the present invention are described below with reference to the accompanying drawings.

Figure 1:
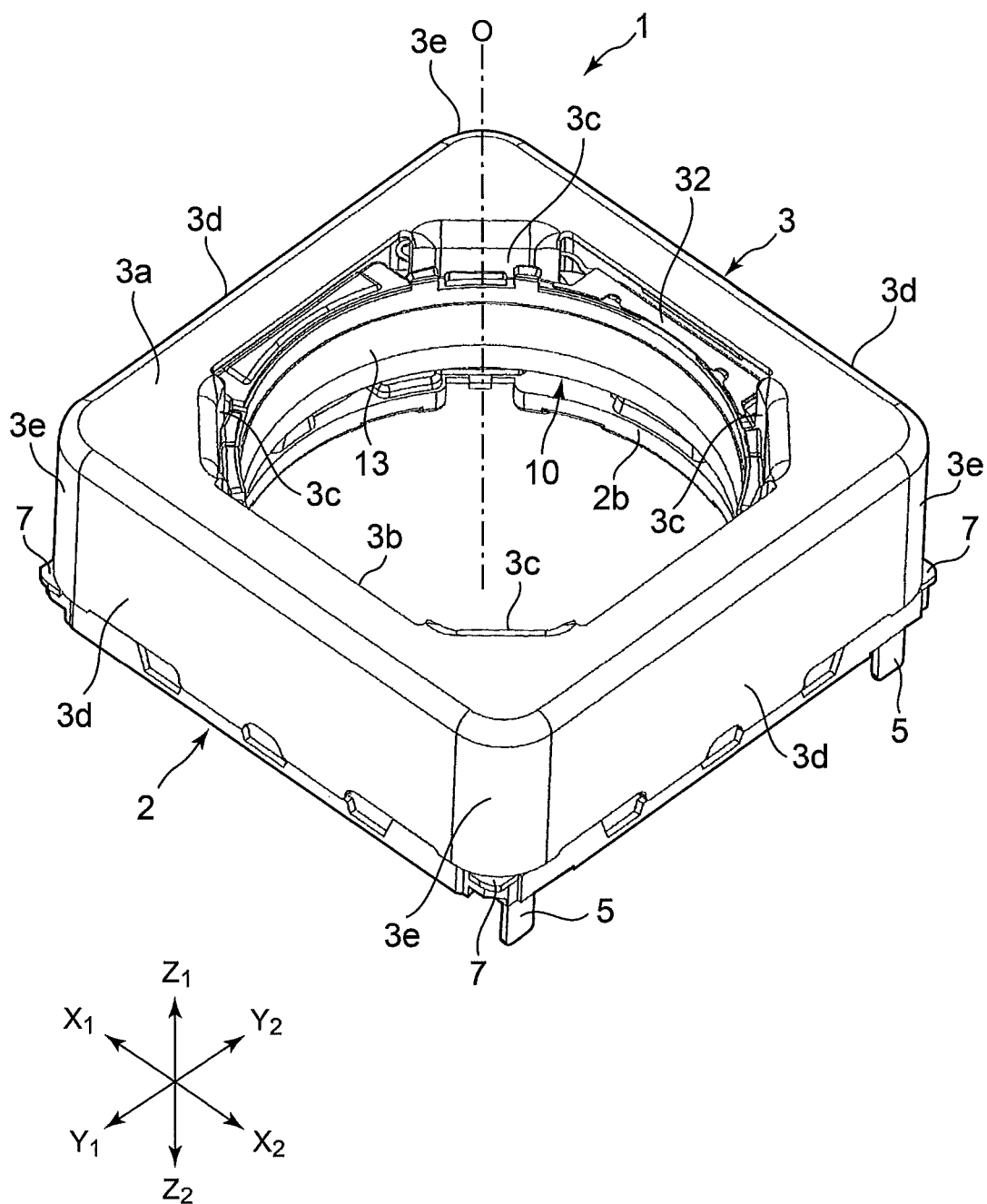
FIG. 1 is a perspective view of a lens driving device according to an embodiment.
Figure 2:
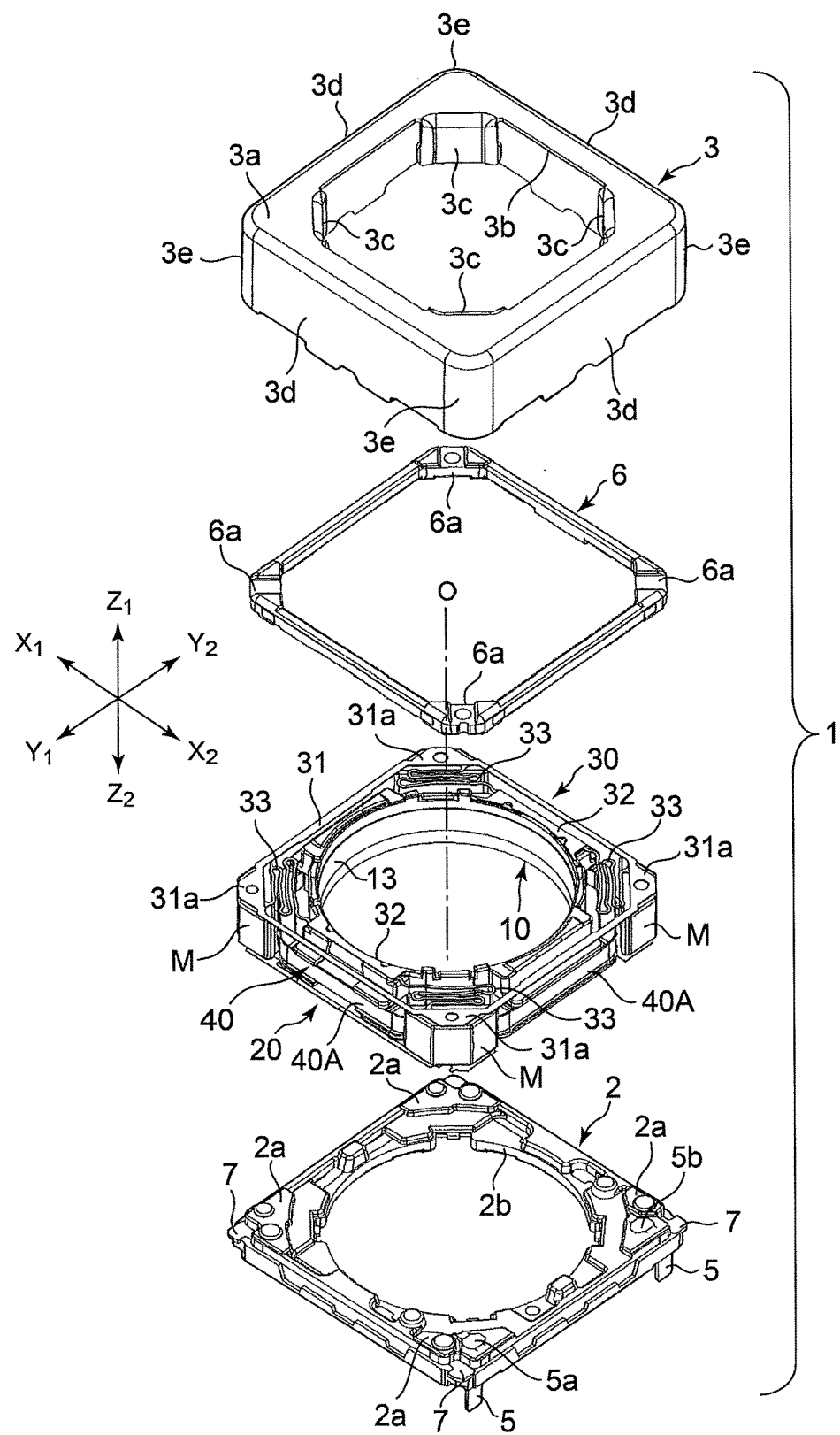
FIG. 2 is an exploded perspective view of the lens driving device of FIG. 1.
Figure 3:
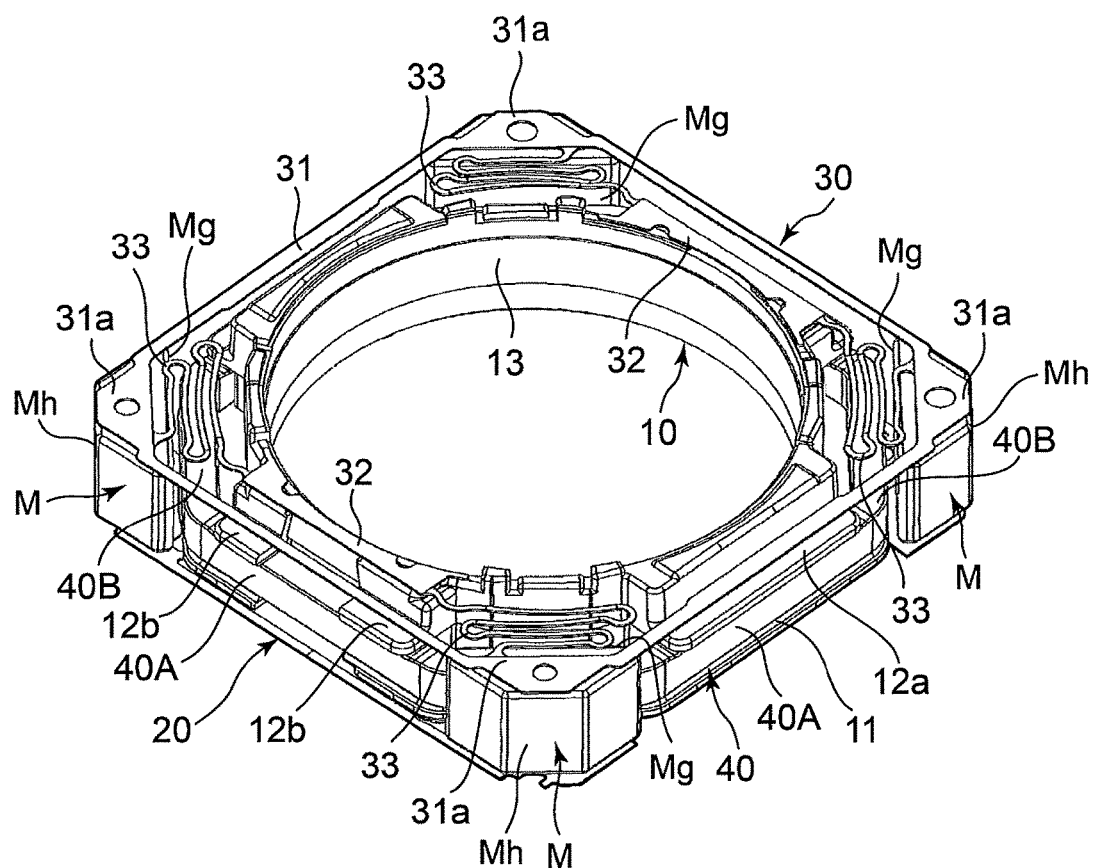
FIG. 3 is a perspective view of a movable part, a coil, a plate spring, and a magnet.
Figure 3:
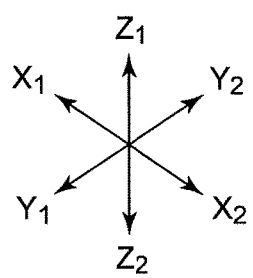
Figure 4:
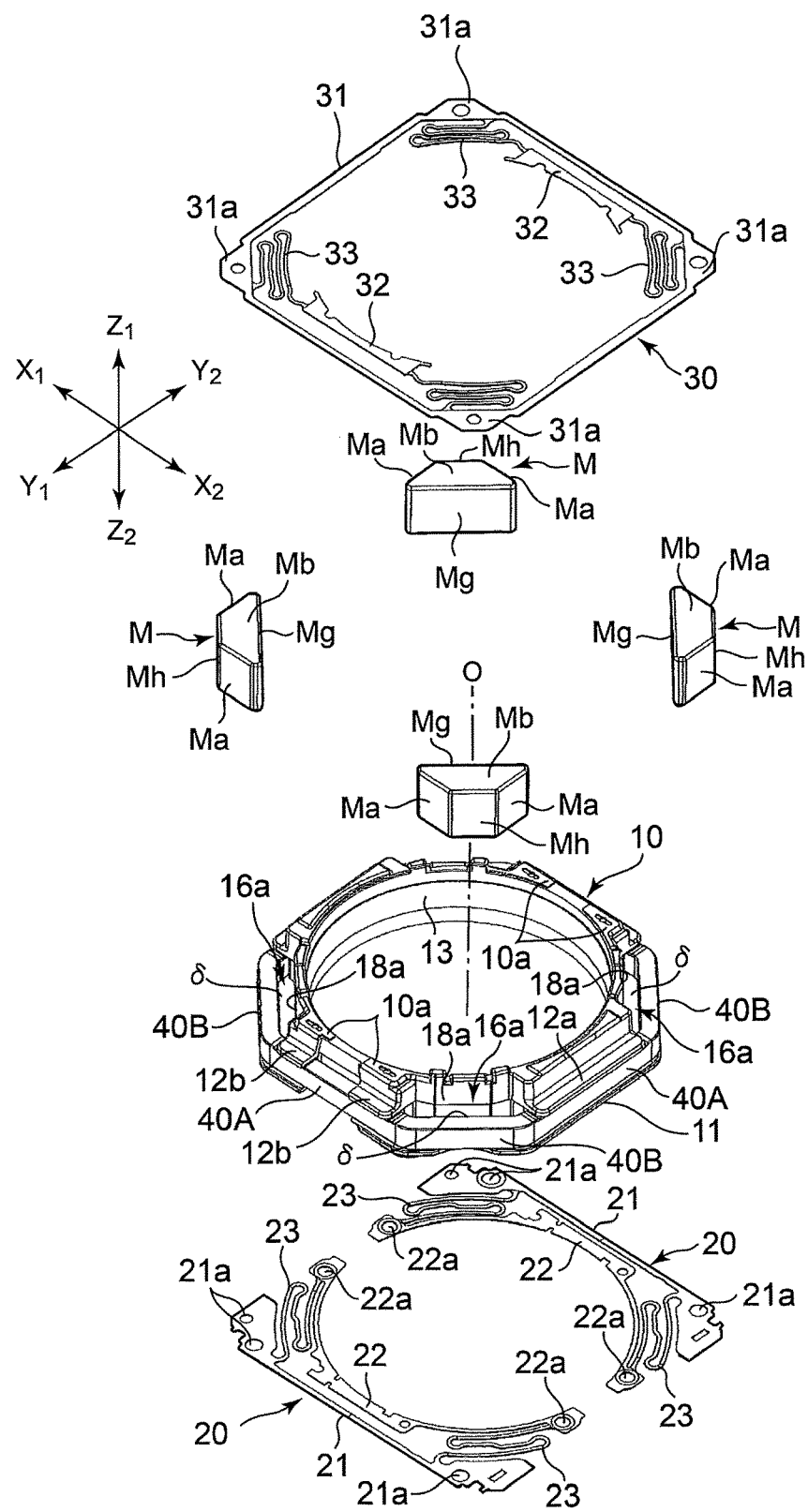
FIG. 4 is an exploded perspective view of the movable part, the coil, the plate spring, and the magnet of FIG. 3.

FIGS. 1 and 2 illustrate an overall configuration of a lens driving device 1 according to an embodiment. FIGS. 3 and 4 illustrate a movable part, a coil, a magnet, and a plate spring. FIGS. 5, 6, 7, and 8 illustrate a movable part and a coil.

Figure 5:
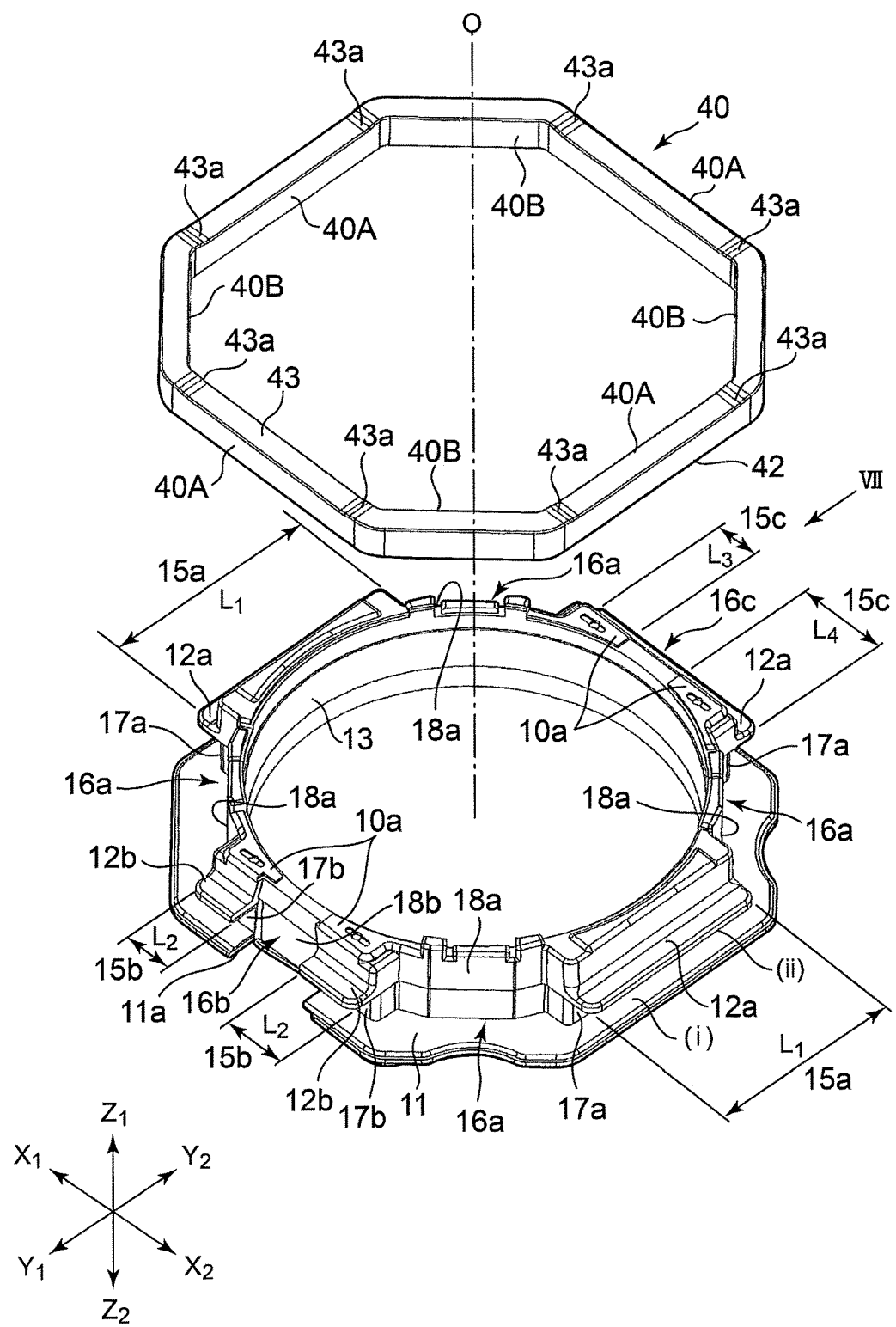
FIG. 5 is an exploded perspective view of the movable part and the coil of FIG. 4.

The lens driving device 1 includes a movable part 10. As illustrated in FIGS. 4 and 5, the movable part 10 is a tubular lens holding part formed of a synthetic resin material. The movable part 10 has a center hole 13, and a lens body (lens barrel or lens tube) is placed in the center hole 13. The lens body may include one lens or a lens set composed of multiple lenses and a lens holder for holding the lens or the lens set. For example, an internal thread may be formed in the center hole 13, an external thread may be formed on the outer surface of the lens holder, and the lens body may be attached to the movable part 10 by screwing the external thread into the internal thread. Alternatively, the lens body may be inserted into the center hole 13, and bonded with an adhesive to the movable part 10.

In each figure, Z1-Z2 indicates the vertical direction (or an optical axis direction) that is parallel to an optical axis O of the lens body. The lens driving device 1 may be installed in a portable electronic apparatus such as a cellphone. An imaging device such as a charge-coupled device (CCD) may be disposed farther in the Z2 direction than the lens driving device 1. A camera module is formed by combining the lens driving device 1 of the present embodiment, a lens body, and an imaging device. In the camera module, the movable part 10 and the lens body attached to the movable part 10 move in the Z1-Z2 directions to automatically focus an image formed on the imaging device.

As illustrated in FIGS. 1 and 2, the lens driving device 1 includes a support base 2 and a cover 3. A case (housing) having an internal housing space is formed by combining the support base 2 and the cover 3. In the present embodiment, a support part (fixing part) is constituted by the support base 2 and the cover 3.

The support base 2 has a quadrangular shape in plan view seen from the optical axis direction, and is formed of a synthetic resin material that is a nonmagnetic material. As illustrated in FIG. 2, spring-fixing parts 2a are formed at four corners of the support base (support part) 2. A pair of separate lower plate springs 20 are attached to the support base 2. FIG. 4 illustrates a shape of the lower plate springs 20. Each of the lower plate springs 20 includes a fixed support part 21, a movable support part 22 disposed inside of the fixed support part 21, and elastic arms 23 that connect the fixed support part 21 and the movable support part 22 to each other. The fixed support part 21, the movable support part 22, and the elastic arms 23 are formed as a monolithic component using a conductive plate-spring metal material. Attaching holes 21a are formed on the X1 side and the X2 side of the fixed support part 21 of the lower plate spring 20. Protrusions of the spring-fixing parts 2a of the support base 2 illustrated in FIG. 2 are fitted into the corresponding attaching holes 21a, and the protrusions are fused to fix the fixed support parts 21 of the lower plate springs 20 to the support base 2.

As illustrated in FIG. 4, attaching holes 22a are formed on the X1 side and the X2 side of the movable support part 22 of the lower plate spring 20. As illustrated in the bottom view of FIG. 6, on the lower surface of the movable part 10 facing the Z2 direction, spring fixing parts 10b are provided on the X1 side and the X2 side. Each of the spring fixing parts 10b includes protrusions 10c and 10d that are integrally formed and protrude in the Z2 direction. The movable support part 22 of the lower plate spring 20 is fixed to the lower surface of the movable part 10 by fitting the protrusions 10c and 10d formed on the lower surface of the movable part 10 into the corresponding attaching holes 22a formed in the movable support part 22 and by fusing the protrusions 10c and 10d.

The cover 3 illustrated in FIGS. 1 and 2 is formed of, for example, a magnetic steel plate (a steel plate made of common steel) and configured to function as a magnetic yoke. The cover 3 includes a ceiling 3a. The support base 2 includes a light transmission hole 2b in the center, and the ceiling 3a of the cover 3 also includes a light transmission hole 3b. The light transmission hole 3b of the cover 3 and the light transmission hole 2b of the support base 2 face each other in the Z1-Z2 direction, and also face the center hole 13 of the movable part 10 from above and below.

The cover 3 has a quadrangular shape in plan view, and includes four flat side plates 3d and corner side plates 3e that connect the flat side plates 3d. The light transmission hole 3b formed in the ceiling 3a has a quadrangular shape in plan view. Opposing yokes 3c bent toward the Z2 direction are integrally formed at the four corners of the light transmission hole 3b. The opposing yokes 3C face the inner surfaces of the corresponding corner side plates 3e.

As illustrated in FIGS. 2 through 4, the lens driving device 1 includes four magnets M. As illustrated in FIG. 4, each magnet M includes outer side surfaces Ma that are at an angle of 90 degrees with each other and a flat upper surface Mb facing the Z1 direction. Each magnet M also includes an inner polarized surface Mg that is an inner side surface facing the optical axis O and an outer polarized surface Mh that is disposed between the two outer side surfaces Ma and opposing the inner polarized surface Mg. The inner polarized surface Mg and the outer polarized surface Mh are flat vertical surfaces that are parallel to the Z1-Z2 direction. The magnet M is polarized such that the inner polarized surface Mg and the outer polarized surface Mh have different polarities. Also, the inner polarized surfaces Mg of all the magnets M are polarized to have the same polarity.

As illustrated in FIGS. 2 through 4, an upper plate spring 30 is provided above (on the Z1 side of) the movable part 10. The upper plate spring 30 includes a fixed support part 31 having a quadrangular frame shape, movable support parts 32 disposed inside of the fixed support part 31, and elastic arms 33 that connect the fixed support part 31 and the movable support parts 32 to each other. The fixed support part 31, the movable support parts 32, and the elastic arms 33 are formed as a monolithic component using a plate-spring metal material. Attaching parts 31a are formed at the four corners of the fixed support part 31.

As illustrated in FIG. 2, a frame 6 is provided above (on the Z1 side of) the upper plate spring 30. The frame 6 is formed of a nonmagnetic material such as a synthetic resin material. Spring supports 6a are formed at four corners of the frame 6. In a state where the upper surfaces of the attaching parts 31a of the upper plate spring 30 facing the Z1 direction are in close contact with the lower surfaces of the spring supports 6a of the frame 6 facing the Z2 direction and where the upper surfaces Mb of the four magnets M are in close contact with the lower surfaces of the attaching parts 31a of the upper plate spring 30 facing the Z2 direction, the upper surfaces Mb of the magnets M, the attaching parts 31a of the upper plate spring 30, and the lower surfaces of the spring supports 6a of the frame 6 are bonded to each other with an adhesive. The frame 6, the upper plate spring 30, and the four magnets M bonded to each other are inserted into the cover 3 from below. Then, the outer side surfaces Ma of the magnets M are bonded with an adhesive to the inner surfaces of the flat side plates 3d of the cover 3. In this state, the opposing yokes 3c of the cover 3 face the inner polarized surfaces Mg of the corresponding magnets M across a gap.

The movable part 10 is formed of a nonmagnetic material such as a synthetic resin material. As illustrated in FIGS. 4 and 5, spring fixing parts 10a are formed on the upper surface of the movable part 10 facing the Z1 direction. After the frame 6, the upper plate spring 30, and the magnets M are placed in the cover 3, an assembly formed by assembling the movable part 10 around which a coil 40 is wound, the lower plate spring 20, and the support base 2 is inserted into the cover 3 from below. Then, the spring fixing parts 10a of the movable part 10 are brought into contact with the lower sides of the movable support parts 32 of the upper plate spring 30, and the spring fixing parts 10a and the movable support parts 32 are bonded to each other with an adhesive. Also, the support base 2 and the cover 3 are fixed to each other.

As illustrated in FIG. 4, each elastic arm 23 of the lower plate springs 20 has a narrow curved shape or a winding shape. Also, each elastic arm 33 of the upper plate spring 30 has a narrow curved shape or a winding shape. The lower surface of the movable part 10 is connected via the lower plate springs 20 to the support base 2, and the upper surface of the movable part 10 is connected via the upper plate spring 30 to the magnets M and the frame 6. Due to the elastic deformation of both the elastic arms 23 of the lower plate springs 20 and the elastic arms 33 of the upper plate spring 30, the movable part 10 supported inside of the cover 3 is movable in the Z1-Z2 direction that is the optical axis direction.

As illustrated in FIG. 5, an outer portion (outer circumferential portion) of the movable part 10 extending in the circumferential direction around the optical axis O of the movable part 10 includes a first restricting protrusion 11 on the lower side (or the Z2 side) of the movable part 10 and second restricting protrusions 12a and 12b on the upper side (or the Z1 side) of the movable part 10. The first restricting protrusion 11 is shaped like a flange that extends continuously along the circumferential direction around the optical axis O. In an Y1-side outer portion (an outer portion facing the Y1 direction) of the movable part 10, a recess 11a is formed in a portion of the first restricting protrusion 11. Also, as illustrated in the bottom view of FIG. 6, in a Y2-side outer portion (an outer portion facing the Y2 direction), a recess 11b is formed in a portion of the first restricting protrusion 11. The second restricting protrusions 12a are formed in X1-side, X2-side, and Y2-side outer portions (outer portions facing the X1, X2, and Y2 directions) of the movable part 10. Two second restricting protrusions 12b are formed apart from each other in the X direction in the Y1-side outer portion of the movable part 10.

As illustrated in FIG. 5, the second restricting protrusions 12a formed in the X1-side, X2-side, and Y2-side outer portions of the movable part 10 have a predetermined length. The lower surface of each of the second restricting protrusions 12a disposed on the X1 side and the X2 side is referred to as an opposing inner surface (ii), an upper surface of the first restricting protrusion 11 facing the opposing inner surface (ii) in the optical axis direction is referred to as an opposing inner surface (i), and a portion where the opposing inner surface (i) and the opposing inner surface (ii) face each other in the optical axis direction is referred to as a protrusion opposing part 15a. A length L1 of the protrusion opposing part 15a corresponds to the length of the second restricting protrusion 12a. The two second restricting protrusions 12b formed in the Y1-side outer portion of the movable part 10 have a predetermined length. The lower surfaces of the second restricting protrusions 12b are referred to as first opposing inner surfaces, upper surfaces of the first restricting protrusion 11 facing the first opposing inner surfaces in the optical axis direction are referred to as second opposing inner surfaces, and portions where the first opposing inner surfaces and the second opposing inner surfaces face each other in the optical axis direction are referred to as protrusion opposing parts 15b. A length L2 of each of the protrusion opposing parts 15b corresponds to the length of the second restricting protrusion 12b.

Figure 6:
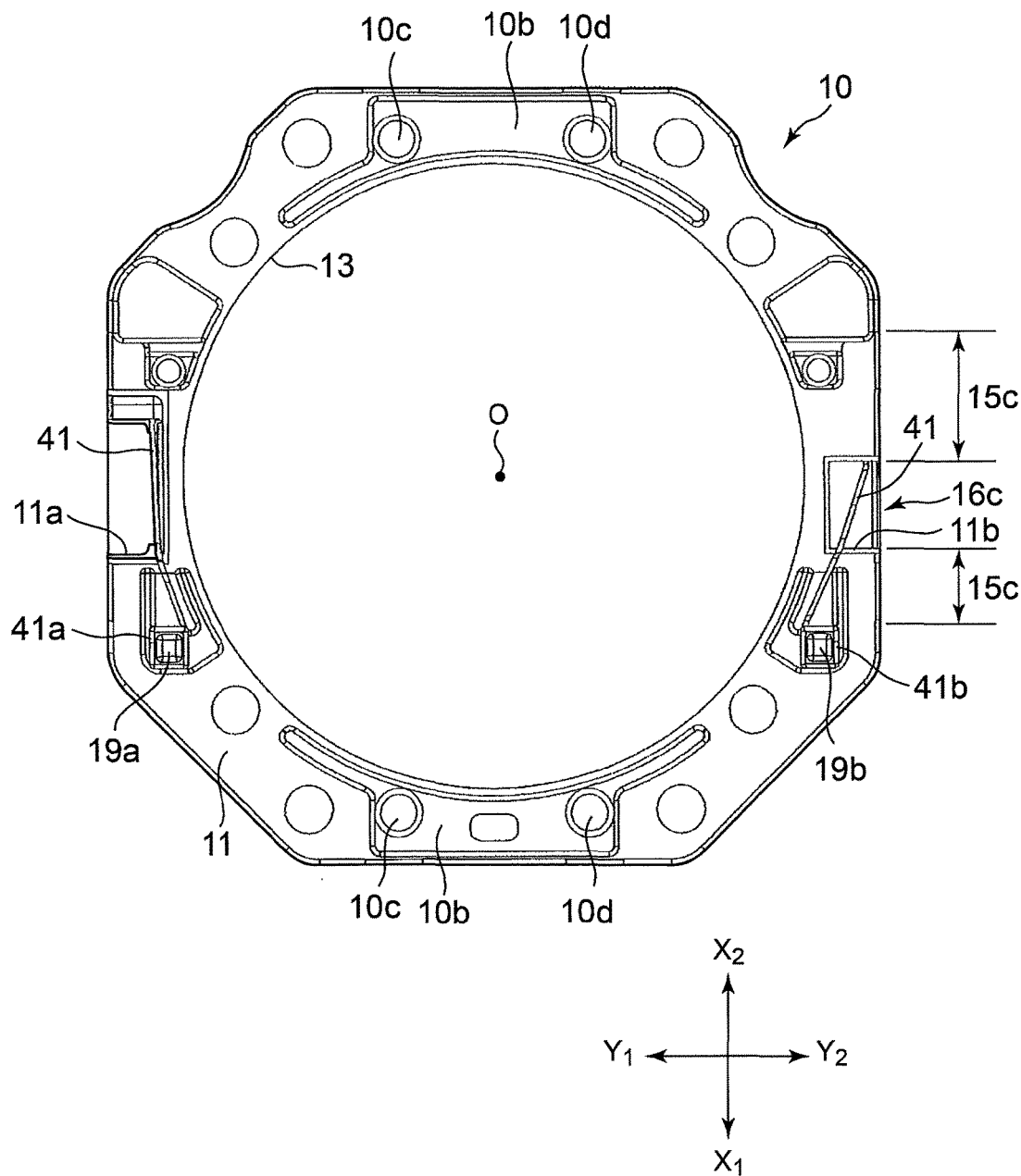
FIG. 6 is a bottom view of the movable part.

In the Y2-side outer portion of the movable part 10, one second restricting protrusion 12a is formed. As illustrated in FIG. 6, the recess 11b is formed in a portion of the first restricting protrusion 11 facing the second restricting protrusion 12a. Lower surfaces of this second restricting protrusion 12a are referred to as first opposing inner surfaces, upper surfaces of the first restricting protrusion 11 excluding the recess 11b and facing the first opposing inner surfaces in the optical axis direction are referred to as second opposing inner surfaces, and portions where the first opposing inner surfaces and the second opposing inner surfaces face each other in the optical axis direction are referred to as protrusion opposing parts 15c. The two protrusion opposing parts 15c are separated by the recess 11b.

Lengths L3 and L4 of the protrusion opposing parts 15c are determined by the length L1 of the second restricting protrusion 12a on the Y2 side and the length of the recess 11b.

Corner outer portions at the corners of the movable part 10 having a substantially-quadrangular shape in plan view are referred to as non-opposing parts 16a where the first restricting protrusion 11 does not face the second restricting protrusions 12a and 12b in the optical axis direction. Also, in the Y1-side outer portion, an area between the two protrusion opposing parts 15b is referred to as a non-opposing part 16b where the first restricting protrusion 11 does not face the second restricting protrusions 12b in the optical axis direction.

In the Y2-side outer portion, an area between the two protrusion opposing parts 15c is referred to as a non-opposing part 16c where the first restricting protrusion 11 and the second restricting protrusion 12a do not face each other in the optical axis direction. The non-opposing part 16c corresponds to an area where the recess 11b illustrated in FIG. 6 is formed in the first restricting protrusion 11. Thus, the first restricting protrusion 11 of the movable part 10 extends continuously except in areas where the recesses 11a and 11b are formed. Accordingly, the first restricting protrusion 11 continuously extends in areas corresponding to the protrusion opposing parts 15a, 15b, and 15c and the non-opposing parts 16a. In contrast, multiple second restricting protrusions 12a and 12b are formed at intervals in the circumferential direction of the movable part 10 so as to be present at least in the protrusion opposing parts 15a, 15b, and 15c.

As illustrated in FIG. 5, in the X1-side, X2-side, and Y2-side outer portions of the movable part 10, three coil-winding surfaces 17a are formed between the first restricting protrusion 11 and the second restricting protrusions 12a in the protrusion opposing parts 15a and 15c. Each of the coil-winding surfaces 17a is a flat vertical surface that extends in the Y direction or the X direction and is parallel to the Z direction. In the Y1-side outer portion of the movable part 10, coil-winding surfaces 17b are formed between the first restricting protrusion 11 and the second restricting protrusions 12b. The coil-winding surfaces 17b are apart from each other in the X direction, and each of the coil-winding surfaces 17b is a flat vertical surface that extends in the X direction and is parallel to the Z direction.

As illustrated in FIG. 5, a recessed outer surface 18a, which is parallel to the Z direction, is formed in each of the non-opposing parts 16a at the four corners of the movable part 10. The recessed outer surface 18a is recessed from the corresponding coil-winding surface(s) 17a in a direction toward the optical axis O. A recessed outer surface 18b is also formed in the non-opposing part 16b in the Y1-side outer portion. The recessed outer surface 18b is recessed from the coil-winding surfaces 17b in a direction toward the optical axis O.

As illustrated in FIG. 6, protrusions 19a and 19b are integrally formed at two positions on the bottom surface of the movable part 10 facing the Z2 direction. The protrusions 19a and 19b are used to fix the ends of a conductor wire 41 that forms the coil 40. The protrusions 19a and 19b protrude in the Z2 direction. The protrusion 19a on the Y1 side is a winding protrusion to which a winding-starting end 41a of the conductor wire 41 is fixed, and the protrusion 19b on the Y2 side is a winding protrusion to which a winding-terminating end 41b of the conductor wire 41 is fixed.

Figure 7:
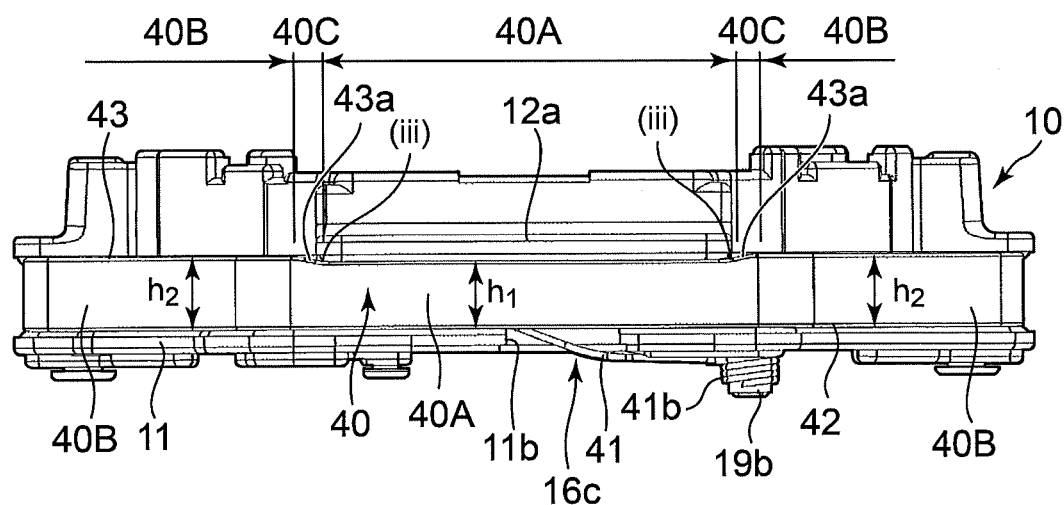
FIG. 7 is a side view of the movable part and the coil of FIG. 5.
Figure 7:
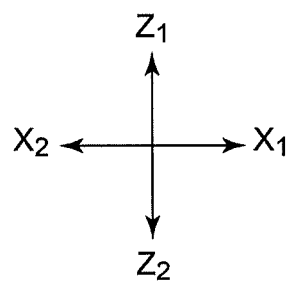
Figure 8:
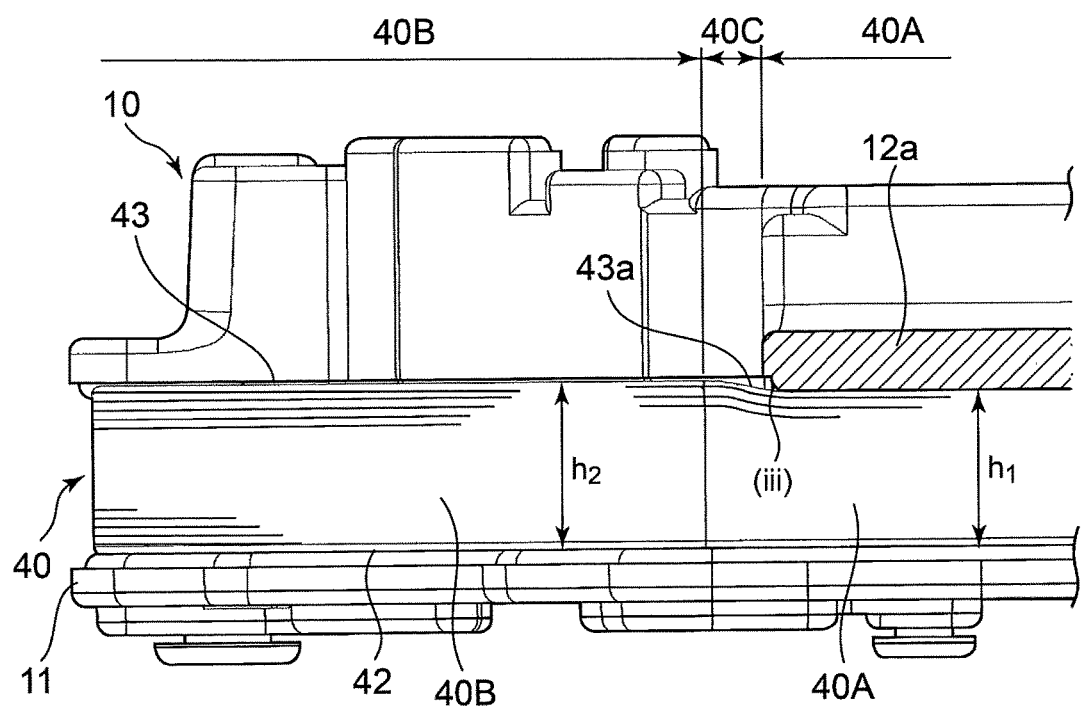
FIG. 8 is an enlarged side view of a portion of FIG. 7.

As illustrated in FIG. 5, in the outer portion of the movable part 10, the protrusion opposing parts 15a, 15b, and 15c where the first restricting protrusion 11 and the second restricting protrusions 12a and 12b face each other and the non-opposing parts 16a, 16b, and 16c where the first restricting protrusion 11 and the second restricting protrusions 12a and 12b do not face each other are arranged alternately in the circumferential direction around the optical axis O. As illustrated in FIGS. 4, 7, and 8, in the outer portion of the movable part 10, the conductor wire 41 is wound multiple times around the protrusion opposing parts 15a, 15b, and 15c and the non-opposing parts 16a, 16b, and 16c to form the coil 40. As illustrated in FIG. 5, the coil 40 has a substantially octagonal shape in plan view. In FIG. 5, only the main part of the coil 40 is illustrated, and parts of the conductor wire 41 including the winding-starting end 41a and the winding-terminating end 41b leading to the main part are omitted.

The conductor wire 41 forming the coil 40 is a coated conductor wire, and includes a conductive metal wire such as a copper wire and an insulating coating layer for covering the copper wire. The coating layer has a two-layer structure including an insulating layer that covers the copper wire and is made of, for example, polyurethane resin and a fusion layer that covers the insulating layer and is made of, for example, polyamide resin.

The coating layer is removed from the winding-starting end 41a of the conductor wire 41, and the winding-starting end 41a is wound around the Y1-side protrusion 19a in FIG. 6. The conductor wire 41 extending from the protrusion 19a is passed through the recess 11a of the first restricting protrusion 11, is guided to the opposing inner surface (i) that is the upper surface of the first restricting protrusion 11, and is wound clockwise in FIG. 6 around the protrusion opposing parts 15a, 15b, and 15c and the non-opposing parts 16a, 16b, and 16c in the outer portion of the movable part 10 to form the coil 40. After the coil 40 is formed, the conductor wire 41 is passed through the recess 11b of the first restricting protrusion 11 and is drawn to the lower side of the movable part 10. The coating layer is removed from the winding-terminating end 41b of the conductor wire 41, and the winding-terminating end 41b is wound around the protrusion 19b of the movable part 10 in FIG.

Three separate metal plates are embedded in the support base 2 and as illustrated in FIG. 2, end portions of two of the metal plates protrude downward from a side of the support base 2 as connecting terminals 5. The other end portions of the two metal plates are exposed on the upper surface of the support base 2 as exposed parts 5a and 5b. The exposed parts 5a and 5b are positioned near two of the four spring-fixing parts 2a that are formed on the X2 side of the upper surface of the support base 2. One of the two lower plate springs 20 in FIG. 4 is brought into contact with and joined to the exposed part 5a on the Y1 side by, for example, welding; and another one of the two lower plate springs 20 is brought into contact with and joined to the exposed part 5b on the Y2 side by, for example, welding. Accordingly, the two connecting terminals 5 are electrically connected to the two lower plate springs 20, respectively.

One of the three separate metal plates embedded in the support base 2, which is not used to form the connecting terminal 5, has a U-shape and is embedded to extend along the X1, Y1, and Y2 side edges. As illustrated in FIGS. 1 and 2, portions of the metal plate protrude outward from the corners of the support base 2 as ground terminals 7. When the support base 2 and the cover 3 are joined together, the ground terminals 7 are connected to the cover 3 and the cover 3 is set at the ground potential.

As illustrated in FIG. 6, on the lower surface of the movable part 10 facing the Z2 direction, the spring fixing parts 10b are provided on the X1 side and the X2 side. In each of the spring fixing parts 10b, the protrusion 10c is integrally formed on the Y1 side, and the protrusion 10d is integrally formed on the Y2 side. As described above, the movable support part 22 of the Y1-side lower plate spring 20 in FIG. 4 is fixed to the spring fixing parts 10b by bringing the X1 and X2 ends of the movable support part 22 into contact with the spring fixing parts 10b, inserting the protrusions 10c into the attaching holes 22a of the movable support part 22, and fusing the protrusions 10c. Similarly, the movable support part 22 of the Y2-side lower plate spring 20 in FIG. 4 is brought into contact with the spring fixing parts 10b, the protrusions 10d are inserted into the attaching holes 22a, and the protrusions 10d are fused.

When the movable support parts 22 of the two lower plate springs 20 are fixed to the lower surface of the movable part 10, the winding-starting end 41a of the conductor wire 41 wound around the protrusion 19a in FIG. 6 becomes substantially in contact with the movable support part 22 of the Y1-side lower plate spring 20. In this state, the winding-starting end 41a and the movable support part 22 are soldered to each other. Also, the winding-terminating end 41b of the conductor wire 41 wound around the protrusion 19b and the movable support part 22 of the Y2-side lower plate spring 20 also contact each other and are soldered to each other. As a result, the two connecting terminals 5 separately embedded in the support base 2 are electrically connected via the corresponding lower plate springs 20 to the winding-starting end 41a and the winding-terminating end 41b of the conductor wire 41, respectively. With this configuration, electricity can be supplied via the two connecting terminals 5 to the conductor wire 41.

Next, a method of winding the conductor wire 41 around the movable part 10, which is a part of a method of manufacturing the lens driving device 1, and details of the shape of the coil 40 formed by winding the conductor wire 41 are described.

Figure 9:
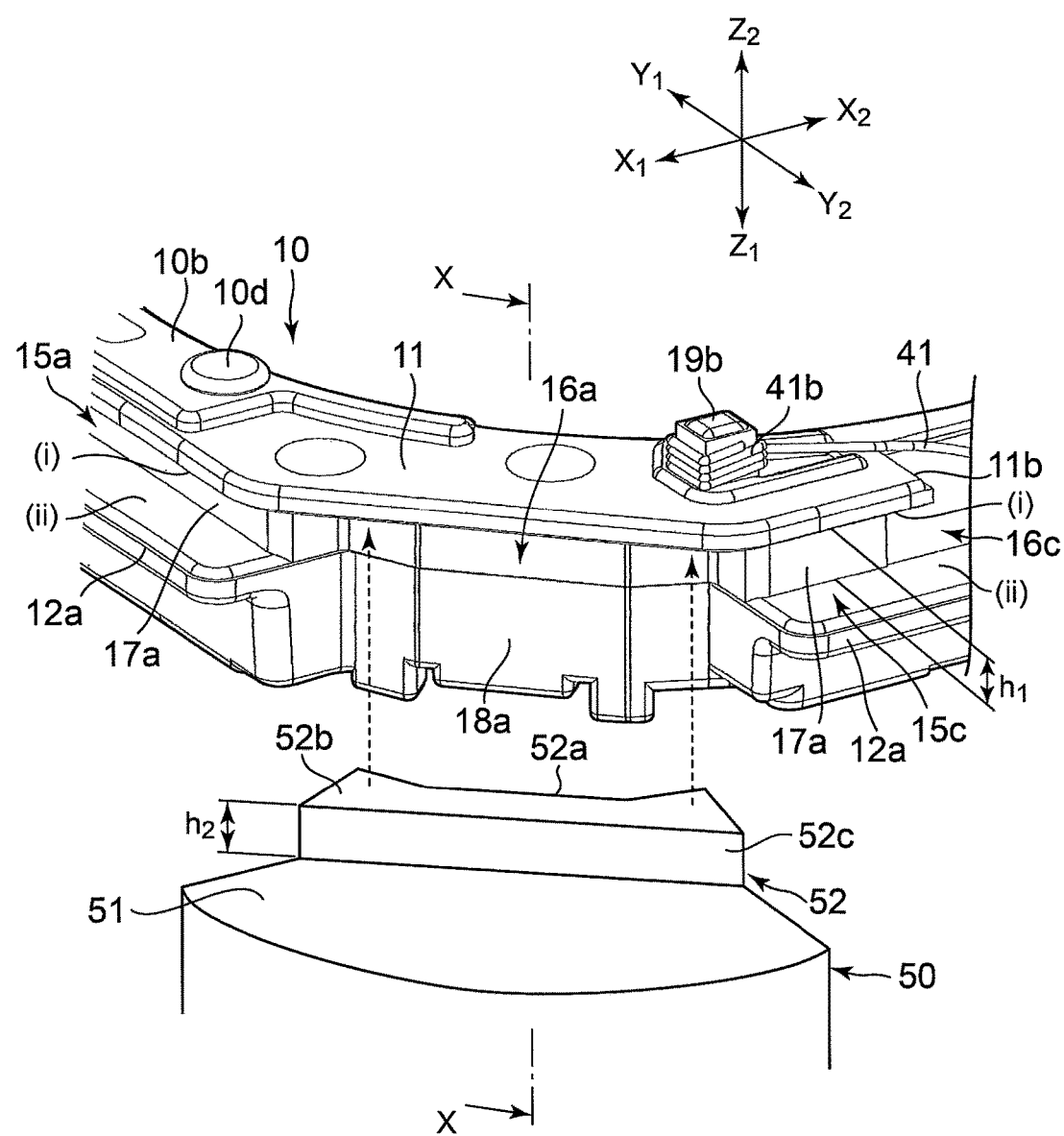
FIG. 9 is a drawing used to describe a process of winding a coil around the movable part.
Figure 10:
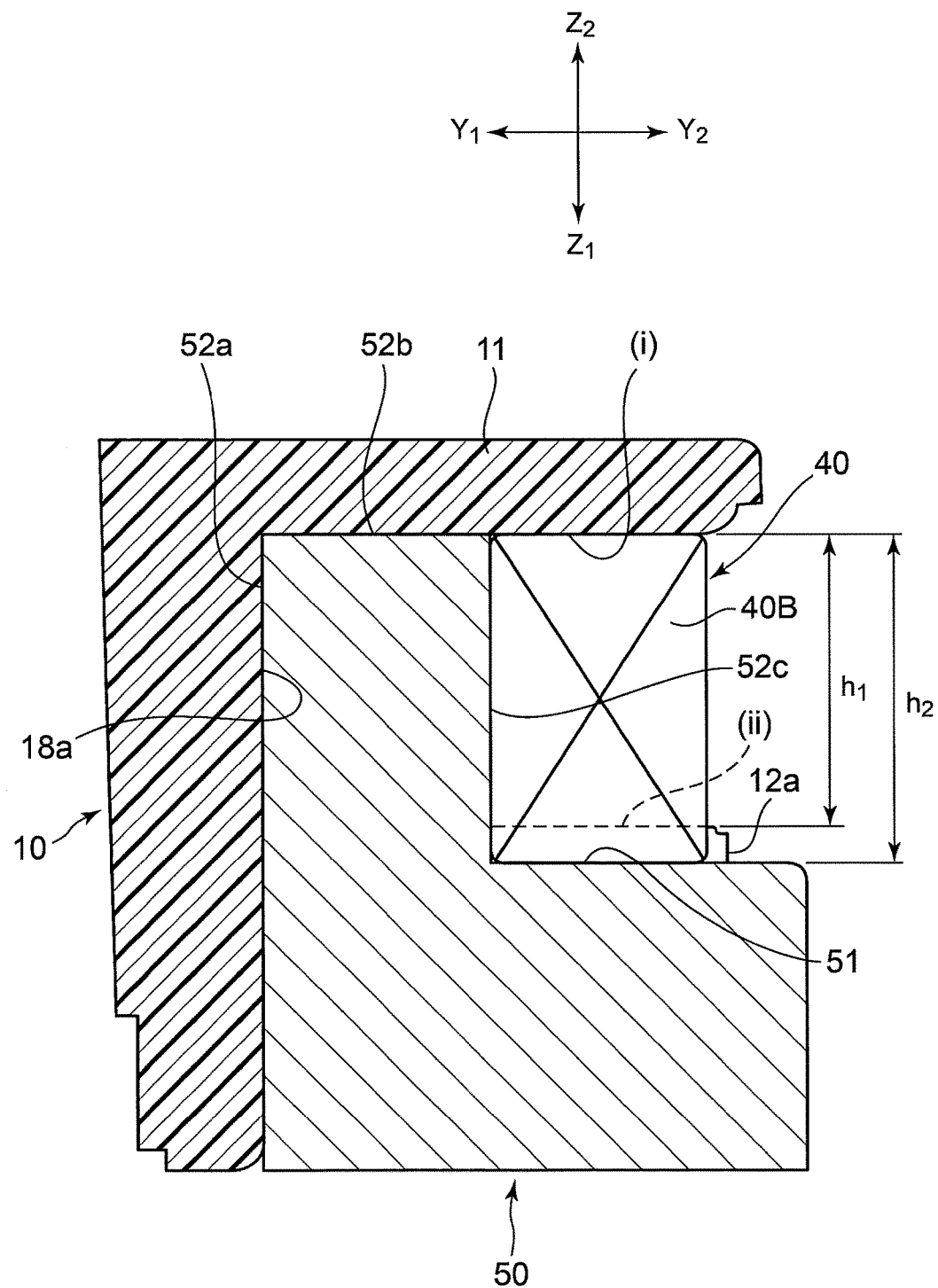
FIG. 10 is a cross-sectional view taken along line X-X of FIG. 9.

In FIG. 9, the movable part 10 is oriented upside down, and the non-opposing part 16a and portions of the protrusion opposing parts 15a and 15c on the corresponding sides of the non-opposing part 16a are illustrated. FIG. 9 also illustrates a portion of a jig 50 used to form the coil 40. FIG. 9 further illustrates the winding-terminating end 41b and a portion of the conductor wire 41 near the winding-terminating end 41b. FIG. 10 is a cross-sectional view taken along line X-X in FIG. 9 and illustrates a state where the coil 40 is wound around a combined structure of the movable part 10 and the jig 50.

The jig 50 in FIG. 9 includes insertion parts 52 that are inserted into the non-opposing parts 16a formed at the four corners of the movable part 10, i.e., into the four corners where the second restricting protrusions 12a and 12b are not formed. As illustrated in FIG. 10, a rear surface 52a of the insertion part 52 is brought into contact with the recessed outer surface 18a of the non-opposing part 16a, and a lower surface 52b of the insertion part 52 facing the Z2 direction is brought into contact with the opposing inner surface (i) of the first restricting protrusion 11 facing the Z1 direction. An outer surface of the insertion part 52 is referred to as a winding surface 52c. When the insertion part 52 is inserted into the non-opposing part 16a, the winding surface 52c becomes substantially continuous with the winding surfaces 17a of the protrusion opposing parts 15a and 15c positioned on the sides of the winding surface 52c in the circumference direction. Similarly, the two winding surfaces 17b of the protrusion opposing parts 15b become substantially continuous with the corresponding winding surfaces 52c. Accordingly, the winding surfaces 17a of the protrusion opposing parts 15a and 15c, the winding surfaces 17b of the protrusion opposing parts 15b, and the winding surfaces 52c of the jig 50 form an octahedral winding surface.

As illustrated in FIG. 9, the jig 50 includes an opposing surface 51. When the insertion part 52 is inserted into the non-opposing part 16a, as illustrated in FIG. 10, the opposing surface 51 and the opposing inner surface (i) of the first restricting protrusion 11 face each other in the optical axis direction. As illustrated in FIGS. 9 and 10, in each of the protrusion opposing parts 15a and 15c where the first restricting protrusion 11 and the second restricting protrusion 12a face each other, h1 indicates the distance in the optical axis direction between the opposing inner surface (i) of the first restricting protrusion 11 and the opposing inner surface (ii) of the second restricting protrusion 12a. In the non-opposing part 16a at each corner of the movable part 10, h2 indicates a distance in the optical axis direction between the opposing inner surface (i) of the first restricting protrusion 11 and the opposing surface 51 of the jig 50. In the present embodiment, h2 is greater than h1 (h1<h2).

Figure 11A:
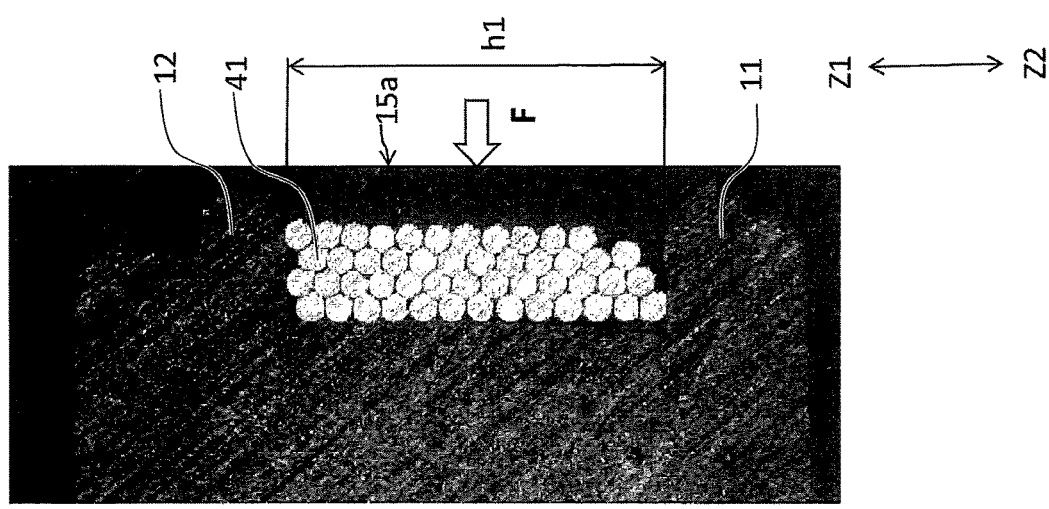
FIG. 11A is a photograph of a cross section of a movable part and a first coil portion of an embodiment.

FIG. 11A is a photograph of a cross section of the movable part 10 and the coil 40 that is formed by winding the conductor wire 41 around the movable part 10 in a space between the opposing inner surface (i) of the first restricting protrusion 11 and the opposing inner surface (ii) of the second restricting protrusion 12a in the protrusion opposing part 15a.

The coil 40 is formed by winding the conductor wire 41 around the outer portion of the movable part 10 in a state where the movable part 10 is coupled with the jig 50. The winding-starting end 41a of the conductor wire 41 is wound around the protrusion 19a (see FIG. 6) on the lower surface of the movable part 10, and the conductor wire 41 is passed through the Y1-side recess 11a of the first restricting protrusion 11 and is guided into the protrusion opposing part 15b where the first restricting protrusion 11 and the second restricting protrusion 12b face each other. In the protrusion opposing parts 15a and 15c, the conductor wire 41 is wound on the winding surfaces 17a between the first restricting protrusion 11 and the second restricting protrusions 12a while keeping the conductor wire 41 in contact with the opposing inner surface (i) of the first restricting protrusion 11. In the non-opposing part 16a, the conductor wire 41 is kept in contact with the opposing inner surface (i) of the first restricting protrusion 11, and is wound on the winding surface 52c of the jig 50.

A first winding layer that is the inner most layer of the coil 40 is wound along the winding surfaces 17a, 17b, and 52c in a direction from the Z2 side to the Z1 side such that turns of the conductor wire 41 are in close contact with each other. When the conductor wire 41 of the first winding layer reaches a position to contact the opposing inner surface (ii) of the second restricting protrusions 12a and 12b, a second winding layer is formed such that the conductor wire 41 contacts the outer side of the first winding layer. In the second winding layer, the conductor wire 41 is wound in the direction from the Z1 side to the Z2 side such that turns of the conductor wire 41 are in close contact with each other. When the conductor wire 41 of the second winding layer contacts the opposing inner surface (i) of the first restricting protrusion 11, the conductor wire 41 is further wound over the second winding layer from the Z2 side to the Z1 side. In the process of winding the conductor wire 41 around the outer portion of the movable part 10, the conductor wire 41 is heated using, for example, hot air to melt the fusion layer of the coating layer of the conductor wire 41. As a result, the coating layers of the turns of the conductor wire 41 are fused together and the coil 40 is formed.

In the embodiment represented by the photograph of FIG. 11A, the coil 40 is formed by winding the conductor wire 41 up to the middle of the fourth winding layer. As in FIG. 11A, each turn of the conductor wire 41 in the second winding layer is positioned between and in close contact with upper and lower turns of the conductor wire 41 in the first winding layer. This also applies to the relationship between the second winding layer and the third winding layer and the relationship between the third winding layer and the fourth winding layer. In the protrusion opposing part 15a, a tightening force F is applied to the conductor wire 41 when the conductor wire 41 is tightly wound from a position where the conductor wire 41 contacts the opposing inner surface (i) of the first restricting protrusion 11 to a position where the conductor wire 41 contacts the opposing inner surface (ii) of the second restricting protrusion 12a such that turns of the conductor wire 41 are in close contact with each other. The tightening force F generates a force that causes turns of the conductor wire 41 in each winding layer to move apart from each other in the Z1-Z2 directions.

As illustrated in FIGS. 7, 8, and 10, in each of the protrusion opposing parts 15a and 15c, the winding layers of the conductor wire 41 are bound between the opposing inner surface (i) of the first restricting protrusion 11 and the opposing inner surface (ii) of the second restricting protrusion 12a, and the width (or height) h1 of the coil 40 in the optical axis direction is made uniform. Portions of the coil 40 positioned in the protrusion opposing parts 15a, 15b, and 15c and having the width h1 are referred to as first coil portions 40A. In contrast, in each non-opposing part 16a where the first restricting protrusion 11 does not face the second restricting protrusion 12a/12b, i.e., where the second restricting protrusion 12a/12b does not exist, there is no force that binds the winding layers of the conductor wire 41 from above and below. Accordingly, in the non-opposing part 16a, the tightening force F causes the winding layers of the conductor wire 41 to widen in the Z1 direction and the width h2 of the coil 40 in the optical axis direction becomes greater than the width h1.

In contrast, in the non-opposing part 16c where the recess 11b is formed, the coil 40 has the width h1 that is the same as the width h1 of the coil 40 in the protrusion opposing parts 15c on the sides of the non-opposing part 16c. For this reason, in FIG. 7, the entire portion of the coil 40 below the second restricting protrusion 12a has the width h1 in the optical axis direction and is indicated as the first coil portion 40A.

As illustrated in FIG. 10, in the non-opposing part 16a, the conductor wire 41 is wound between the opposing inner surface (i) of the first restricting protrusion 11 and the opposing surface 51 of the jig 50. Accordingly, in the non-opposing part 16a, the coil 40 is set at a uniform width h2 in the optical axis direction, which corresponds to the distance between the opposing inner surface (i) and the opposing surface 51. Portions of the coil 40 positioned in the non-opposing parts 16a and having the width h2 are referred to as second coil portions 40B. The width h2 of the second coil portions 40B is greater than the distance (the width h1 of the first coil portions 40A) in the optical axis direction between the opposing inner surface (i) of the first restricting protrusion 11 and the opposing inner surface (ii) of the second restricting protrusion 12a/12b in each of the protrusion opposing parts 15a, 15b, and 15c (h1<h2).

As illustrated in FIGS. 7 and 8, the coil 40 further includes a boundary coil portion 40C between each of the first coil portions 40A having the width h1 and formed in the protrusion opposing parts 15a and 15c and each of the second coil portions 40B having the width h2 and formed in the non-opposing parts 16a. The boundary coil portions 40C are formed in positions facing the ends (iii) of the second restricting protrusion 12a in the circumferential direction.

A first coil edge 42 of the coil 40 facing the Z2 direction is along the opposing inner surface (i) of the first restricting protrusion 11 that is substantially continuous in the circumferential direction. Accordingly, in both of the first coil portions 40A and the second coil portions 40B, the position of the first coil edge 42 in the optical axis direction is determined by the opposing inner surface (i) of the first restricting protrusion 11. That is, the height of the first coil edge 42 in the optical axis direction is the same in the first coil portions 40A and the second coil portions 40B. In contrast, as illustrated in FIGS. 7 and 8, a second coil edge 43 of the coil 40 facing the Z1 direction is positioned at different heights in the optical axis direction in the first coil portion 40A and the second coil portion 40B. Accordingly, in the boundary coil portion 40C, an inclined portion 43a is formed in a position that faces or contacts the end (iii) of the second restricting protrusion 12a in the circumferential direction.

Figure 11B:
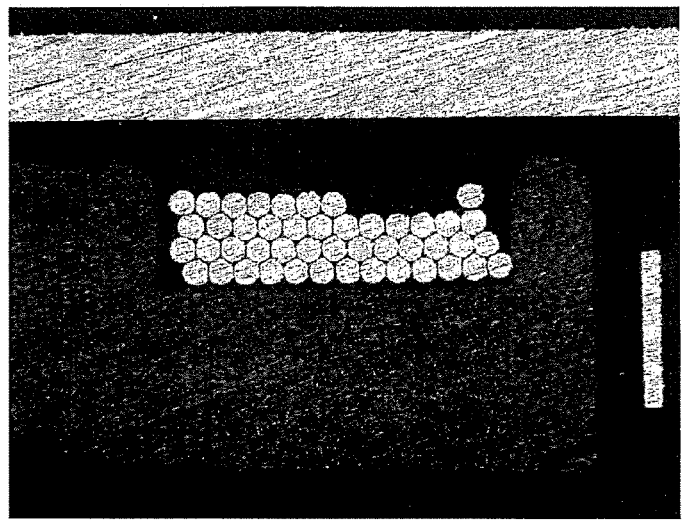
FIG. 11B is a photograph of a cross section of a movable part and a first coil portion of a comparative example.

As illustrated in FIG. 11A, the tightening force F is applied to the winding layers of the conductor wire 41 forming the coil 40 on the outer portion of the movable part 10 in a state where the fusion layers of turns of the conductor wire 41 are fused together by heating. The first coil portion 40A in the protrusion opposing part 15a is bound between the first restricting protrusion 11 and the second restricting protrusion 12 (12a) positioned above and below the first coil portion 40A. Accordingly, the thickness of at least the portions of the coating layer of the conductor wire 41 facing the Z1 and Z2 directions is less than the thickness of the coating layer of the conductor wire 41 forming the second coil portion 40B in the non-opposing part 16a. FIG. 11B is a photograph of a cross section of a coil of a comparative example that is formed by winding the conductor wire 41 up to the fourth winding layer without binding the winding layers in the Z1-Z2 direction. The thickness of portions of the coating layer of the conductor wire 41 in the first coil portion 40A that face the optical axis direction in FIG. 11A is less than the thickness of the coating layer of the conductor wire 41 in the comparative example of FIG. 11B.

As illustrated in FIG. 5, in the Y1-side outer portion of the movable part 10, the non-opposing part 16b is formed between the X1-side second restricting protrusion 12b and the X2-side second restricting protrusion 12b. When forming the coil 40 in the non-opposing part 16b, the distance between opposing surfaces of the jig in the optical axis direction is set at h1. As a result, the width in the optical axis direction of the coil 40 in the non-opposing part 16b becomes the same as the width h1 of the first coil portions 40A in the protrusion opposing parts 15b.

In the protrusion opposing parts 15a and 15c, the first coil portions 40A of the coil 40 are tightly wound around the outer portion of the movable part 10 to contact the opposing inner surface (i) of the first restricting protrusion 11 and the opposing inner surfaces (ii) of the second restricting protrusions 12a. This configuration makes it possible to prevent the coil 40 from moving, rattling, or being shifted in the optical axis direction (the Z1-Z2 direction) with respect to the movable part 10. Also, as illustrated in FIGS. 7 and 8, the inclined portions 43a are formed in the second coil edge 43 of the coil 40 facing the Z1 direction at positions facing or contacting the ends (iii) of the second restricting protrusion 12a in the circumferential direction. This configuration makes it possible to prevent the coil 40 from moving, rattling, or being shifted in the circumferential direction with respect to the movable part 10.

The above configurations eliminate the need to bond the coil 40 to the movable part 10 using an adhesive, and make it possible to immovably fix the coil 40 to the movable part 10 only by the adhesion between the fused fusion layer of the coating layer of the conductor wire 41 and the coil-winding surfaces 17a and 17b of the movable part 10. Also, even when an adhesive is used to bond the coil 40 to the movable part 10, the above configurations make it possible to reduce the amount of adhesive. Accordingly, the above configurations make it possible to prevent an adhesive from adhering to, for example, the elastic arms 23 of the lower plate springs 20.

Further, even when an undesired external impact is applied to the lens driving device 1 due to, for example, a fall, the above configurations make it possible to prevent the coil 40 from moving in the circumferential direction with respect to the movable part 10. This in turn makes it possible to prevent an excessive tension from being applied to the conductor wire 41 extending from the coil 40 and fixed to the protrusions 19a and 19b in FIG. 6, and thereby makes it possible to prevent the end portions of the conductor wire 41 from being broken.

In FIG. 5, the coil 40 and the movable part 10 are illustrated separately. The coil 40 includes the first coil portions 40A that have the height h1 and extend linearly in the X direction or the Y direction. Each of the first coil portions 40A includes a flat inner side facing the optical axis O. The boundary coil portions 40C adjacent to the ends of the first coil portion 40A extend linearly and are continuous with the first coil portion 40A. Each of the boundary coil portions 40C also includes a flat inner side facing the optical axis O. The total length of the flat inner side of the first coil portion 40A and the inner sides of the boundary coil portions 40C adjacent to the ends of the first coil portion 40A is greater than the length L1 of the second restricting protrusion 12a. The inclined portions 43a of the second coil edge 43 of the coil 40 facing the Z1 direction are formed in the boundary coil portions 40C of the coil 40 that extend linearly and include flat inner sides. The inclined portions 43a face and contact the corresponding ends (iii) of the second restricting protrusion 12a. With this configuration, the movement of the inclined portions 43a in the X direction and the Y direction is restricted by the ends (iii) of the second restricting protrusion 12, and the movement of the coil 40 relative to the movable part 10 is restricted. Also, the total length of the flat inner side of the first coil portion 40A and the inner sides of the boundary coil portions 40C adjacent to the ends of the first coil portion 40A is greater than the length of an area where the coil-winding surface 17a or the coil-winding surfaces 17b are formed. This configuration makes it possible to prevent the flat inner sides from being damaged by the ends of the coil-winding surfaces 17a and 17b. Each of the first coil portions 40A and the boundary coil portions 40C also includes a flat outer side that is opposite the flat inner side.

As illustrated in FIG. 5, the coil 40 has an octagonal shape in plan view. The second coil portions 40B extend linearly in directions that are inclined with respect to the X direction and the Y direction. Each of the second coil portions 40B includes a flat inner side facing the optical axis O and a flat outer side located opposite the flat inner side. As illustrated in FIG. 4, in a state where the coil 40 is wound around the movable part 10, a gap 5 is formed between the recessed outer surface 18a in each non-opposing part 16a of the movable part 10 and the flat inner side of the second coil portion 40B. When the movable part 10 with the coil 40 is housed in the cover 3, the opposing yokes 3c of the cover 3 illustrated in FIGS. 1 and 2 are inserted into the corresponding gaps 5. Also, the flat inner polarized surfaces Mg of the magnets M face the flat outer sides of the second coil portions 40B across gaps. Accordingly, each of the second coil portions 40B of the coil 40 is placed between the opposing yoke 3c and the magnet M and faces both the opposing yoke 3c and the inner polarized surface Mg of the magnet M across gaps.

Next, operations of the lens driving device 1 with the above described configuration and a camera module including the lens driving device 1 are described.

When a drive current is applied to the connecting terminals 5 protruding from the support base 2, the drive current is applied via a pair of the lower plate springs 20 to the winding-starting end 41a and the winding-terminating end 41b of the conductor wire 41 illustrated in FIG. 6. Then, the movable part 10 is moved in the Z1-Z2 directions by the electromagnetic force generated by the electric current flowing through the coil 40 and the magnetic field of the magnets M. By the movement of the movable part 10, an image formed by the lens body on the imaging device is focused.

In the embodiment described above, as illustrated in FIG. 6, the winding-starting end 41a and the winding-terminating end 41b of the conductor wire 41 forming the coil 40 are wound around the protrusions 19a and 19b on the lower surface of the movable part 10, and the winding-starting end 41a and the winding-terminating end 41b are soldered and electrically connected to the corresponding lower plate springs 20. However, the present invention is not limited to the above-described embodiment. For example, the winding-starting end 41a and the winding-terminating end 41b leading from the conductor wire 41 forming the coil 40 may be directly soldered and electrically connected to the corresponding lower plate springs 20. Also, a conductive adhesive may be used instead of solder.

Also in the above-described embodiment, a lens driving device that performs automatic focusing by moving the movable part 10 or a lens holding part only in the optical axis direction is described. However, the present invention is not limited to the above-described embodiment. For example, the present invention may be applied to a lens driving device that can perform so-called image stabilization by moving a movable unit for automatic focusing in a direction intersecting with the optical axis direction. In this case, the upper plate spring is generally divided into two upper plate springs, and the winding-starting end 41a and the winding-terminating end 41b of the conductor wire 41 forming the coil 40 are soldered to the corresponding upper plate springs.

According to an embodiment, a lens driving device includes a movable part on which a lens body is mountable, a plate spring that supports the movable part such that the movable part is movable in an optical axis direction of an optical axis of the lens body, a coil provided on the movable part, and magnets facing the coil. A first restricting protrusion and second restricting protrusions are formed in an outer portion of the movable part. The outer portion includes protrusion opposing parts where the first restricting protrusion and the second restricting protrusions face each other in the optical axis direction and non-opposing parts where the first restricting protrusion and the second restricting protrusions do not face each other in the optical axis direction. The protrusion opposing parts and the non-opposing parts are arranged alternately in the outer portion in a circumferential direction around the optical axis. The coil is formed by winding a conductor wire around the outer portion of the movable part in the circumferential direction. The coil includes first coil portions positioned in the protrusion opposing parts and second coil portions positioned in at least some of the non-opposing parts, and the width of the second coil portions in the optical axis direction is greater than the width of the first coil portions in the optical axis direction. This configuration prevents the coil from moving in the circumferential direction with respect to the movable part. That is, this configuration makes it possible to prevent the coil from moving on the movable part even when the coil is not fixed to the movable part using an adhesive or fixed to the movable part using a very small amount of adhesive and an undesirable strong external impact is applied to the lens driving device. Thus, the configuration of the embodiment makes it possible to prevent a terminal portion of a conductor wire leading from a coil from being broken and prevent a junction between the terminal portion of the conductor wire and a component such as a plate spring from being damaged.

Also, according to an embodiment, the conductor wire is wound tightly in the protrusion opposing parts such that turns of the conductor wire contact each other and also contact both the opposing inner surface of the first restricting protrusion and the opposing inner surfaces of the second restricting protrusions. This configuration makes it possible to restrict the width of the first coil portions in the optical axis direction in the protrusion opposing parts. In contrast, in the non-opposing parts, the second coil portions of the coil are not bound between the opposing inner surfaces and therefore the width of the second coil portions in the optical axis direction increases due to the tightening force. Inclined portions may be formed in a coil edge at positions facing the ends of the second restricting protrusions in the circumferential direction. The inclined portions prevent the coil from being shifted in the circumferential direction with respect to the movable part.

In the non-opposing parts, the conductor wire may be wound between the first restricting protrusion and a jig to properly set the width of the second coil portions.

A lens driving device, a camera module, and a method for manufacturing the lens driving device according to embodiments of the present invention are described above. However, the present invention is not limited to the specifically disclosed embodiments, and variations and modifications may be made without departing from the scope of the present invention.

What is claimed is:

1. A lens driving device, comprising:
a movable part on which a lens body is mountable;
a plate spring that supports the movable part such that the movable part is movable in an optical axis direction of an optical axis of the lens body;
a coil provided on the movable part; and
magnets facing the coil, wherein
a first restricting protrusion and second restricting protrusions are formed in an outer portion of the movable part;
the outer portion includes protrusion opposing parts where the first restricting protrusion and the second restricting protrusions face each other in the optical axis direction and non-opposing parts where the first restricting protrusion and the second restricting protrusions do not face each other in the optical axis direction, the protrusion opposing parts and the non-opposing parts being arranged alternately in the outer portion in a circumferential direction around the optical axis;
the coil is formed by winding a conductor wire around the outer portion of the movable part in the circumferential direction;
the coil includes first coil portions positioned in the protrusion opposing parts and second coil portions positioned in at least some of the non-opposing parts; and
a width of the second coil portions in the optical axis direction is greater than a width of the first coil portions in the optical axis direction.

2. The lens driving device as claimed in claim 1, wherein
the first restricting protrusion includes a portion that extends continuously across one or more of the protrusion opposing parts and one or more of the non-opposing parts;
the second restricting protrusions are formed at intervals in the circumferential direction so as to be present at least in the protrusion opposing parts; and
a first coil edge of the coil facing the first restricting protrusion is at a same height in the optical axis direction in the first coil portions and the second coil portions.

3. The lens driving device as claimed in claim 1, wherein
the coil includes a second coil edge, portions of the second coil edge facing the second restricting protrusions;
the second coil edge includes inclined portions disposed between the first coil portions and the second coil portions; and
the inclined portions face ends of the second restricting protrusions in the circumferential direction.

4. The lens driving device as claimed in claim 3, wherein
the coil also includes boundary coil portions disposed adjacent to ends of the first coil portions;
the first coil portions and the boundary coil portions include flat inner sides extending in the circumferential direction; and
the inclined portions are formed in portions of the second coil edge corresponding to the boundary coil portions.

5. The lens driving device as claimed in claim 1, wherein
the second coil portions of the coil include flat inner sides and flat outer sides that extend in the circumferential direction; and
the magnets are disposed such that polarized surfaces of the magnets face the second coil portions.

6. The lens driving device as claimed in claim 1, wherein
the conductor wire includes a metal wire and an insulating coating layer covering the metal wire; and
at least a portion of the coating layer, which faces the optical axis direction, of the conductor wire in the first coil portions is thinner than the coating layer of the conductor wire in the second coil portions.

7. A camera module, comprising:
the lens driving device of claim 1;
a lens body held by the movable part of the lens driving device; and
an imaging device facing the lens body.

8. A method of manufacturing a lens driving device, which includes a movable part on which a lens body is mountable, a plate spring that supports the movable part such that the movable part is movable in an optical axis direction of an optical axis of the lens body, a coil provided on the movable part, and magnets facing the coil, the method comprising:
forming the movable part including an outer portion where a first restricting protrusion and second restricting protrusions are formed, the outer portion including protrusion opposing parts where the first restricting protrusion and the second restricting protrusions face each other in the optical axis direction and non-opposing parts where the first restricting protrusion and the second restricting protrusions do not face each other in the optical axis direction, the protrusion opposing parts and the non-opposing parts being arranged alternately in the outer portion in a circumferential direction around the optical axis; and
forming the coil by winding a conductor wire around the outer portion of the movable part in the circumferential direction, wherein
first coil portions are formed in the protrusion opposing parts by winding the conductor wire from an opposing inner surface of the first restricting protrusion to opposing inner surfaces of the second restricting protrusions such that turns of the conductor wire contact each other; and
second coil portions are formed in at least some of the non-opposing parts, a width of the second coil portions in the optical axis direction being greater than a width of the first coil portions in the optical axis direction.

9. The method as claimed in claim 8, wherein
in the protrusion opposing parts, the conductor wire is bound between the opposing inner surface of the first restricting protrusion and the opposing inner surfaces of the second restricting protrusions to set the width of the first coil portions in the optical axis direction; and
in the non-opposing parts, the conductor wire is not bound between the opposing inner surfaces so that the width of the second coil portions in the optical axis direction becomes greater than the width of the first coil portions in the optical axis direction.

10. The method as claimed in claim 9, wherein
the first restricting protrusion includes a portion that extends continuously across one or more of the protrusion opposing parts and one or more of the non-opposing parts;

the second restricting protrusions are formed at intervals in the circumferential direction so as to be present at least in the protrusion opposing parts; and the conductor wire is wound while keeping the conductor wire in contact with the opposing inner surface of the first restricting protrusion so that a first coil edge of the coil facing the first restricting protrusion is at a same height in the optical axis direction in the first coil portions and the second coil portions.

11. The method as claimed in claim 10, wherein when the conductor wire is wound around the movable part while keeping the conductor wire in contact with the opposing inner surfaces of the second restricting protrusions, inclined portions are formed in a second coil edge of the coil in positions that face ends of the second restricting protrusions in the circumferential direction.

12. The method as claimed in claim 8, wherein in the non-opposing parts, a jig is positioned such that a part of the jig faces the opposing inner surface of the first restricting protrusion in the optical axis direction; and the conductor wire is wound between the opposing inner surface of the first restricting protrusion and the jig to set the width of the second coil portions in the optical axis direction.

* * * * *